(12) United States Patent
Abbasi et al.

(10) Patent No.: US 11,471,785 B2
(45) Date of Patent: Oct. 18, 2022

(54) METHOD AND SYSTEM FOR PURIFYING CONTAMINATED WATER

(71) Applicant: Oregon State University, Corvallis, OR (US)

(72) Inventors: Bahman Abbasi, Bend, OR (US); Xiang Zhang, Bend, OR (US); Hannah O'Hern, Corvallis, OR (US); Elnaz Nikooei, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 14 days.

(21) Appl. No.: 16/985,043

(22) Filed: Aug. 4, 2020

(65) Prior Publication Data

US 2021/0039009 A1 Feb. 11, 2021

Related U.S. Application Data

(60) Provisional application No. 62/882,970, filed on Aug. 5, 2019.

(51) Int. Cl.
| | | |
|---|---|---|
| *C02F 1/10* | (2006.01) | |
| *B01D 1/30* | (2006.01) | |
| *B01D 3/34* | (2006.01) | |
| *B01D 5/00* | (2006.01) | |
| *B01D 1/00* | (2006.01) | |
| *C02F 103/10* | (2006.01) | |
| *C02F 101/16* | (2006.01) | |
| *C02F 101/32* | (2006.01) | |
| *C02F 101/34* | (2006.01) | |
| *C02F 101/10* | (2006.01) | |
| *C02F 101/12* | (2006.01) | |
| *C02F 101/30* | (2006.01) | |

(52) U.S. Cl.
CPC .......... *B01D 1/305* (2013.01); *B01D 1/0023* (2013.01); *B01D 3/346* (2013.01); *B01D 5/006* (2013.01); *C02F 1/10* (2013.01); *C02F 2101/101* (2013.01); *C02F 2101/108* (2013.01); *C02F 2101/12* (2013.01); *C02F 2101/16* (2013.01); *C02F 2101/301* (2013.01); *C02F 2101/322* (2013.01); *C02F 2101/34* (2013.01); *C02F 2103/10* (2013.01)

(58) Field of Classification Search
CPC ...... B01D 1/0023; B01D 1/305; B01D 3/346; B01D 5/006; C02F 1/10; C02F 2101/101; C02F 2101/108; C02F 2101/12; C02F 2101/16; C02F 2101/301; C02F 2101/322; C02F 2101/34; C02F 2103/10
See application file for complete search history.

(56) References Cited

U.S. PATENT DOCUMENTS

| | | | | |
|---|---|---|---|---|
| 3,517,485 A | * | 6/1970 | Dell Agnese | B01D 47/10 96/228 |
| 3,601,374 A | * | 8/1971 | Wheeler | B01D 47/10 261/109 |
| 3,613,333 A | * | 10/1971 | Gardenier | C21C 5/40 95/225 |

(Continued)

*Primary Examiner* — Jonathan Miller
(74) *Attorney, Agent, or Firm* — Klarquist Sparkman, LLP

(57) ABSTRACT

This disclosure concerns a system for purifying contaminated water and a method for using the system. More specifically, the invention concerns removing contaminants, such as those introduced by fracking, from a contaminated water.

26 Claims, 5 Drawing Sheets

(56) References Cited

U.S. PATENT DOCUMENTS

Figure 1:
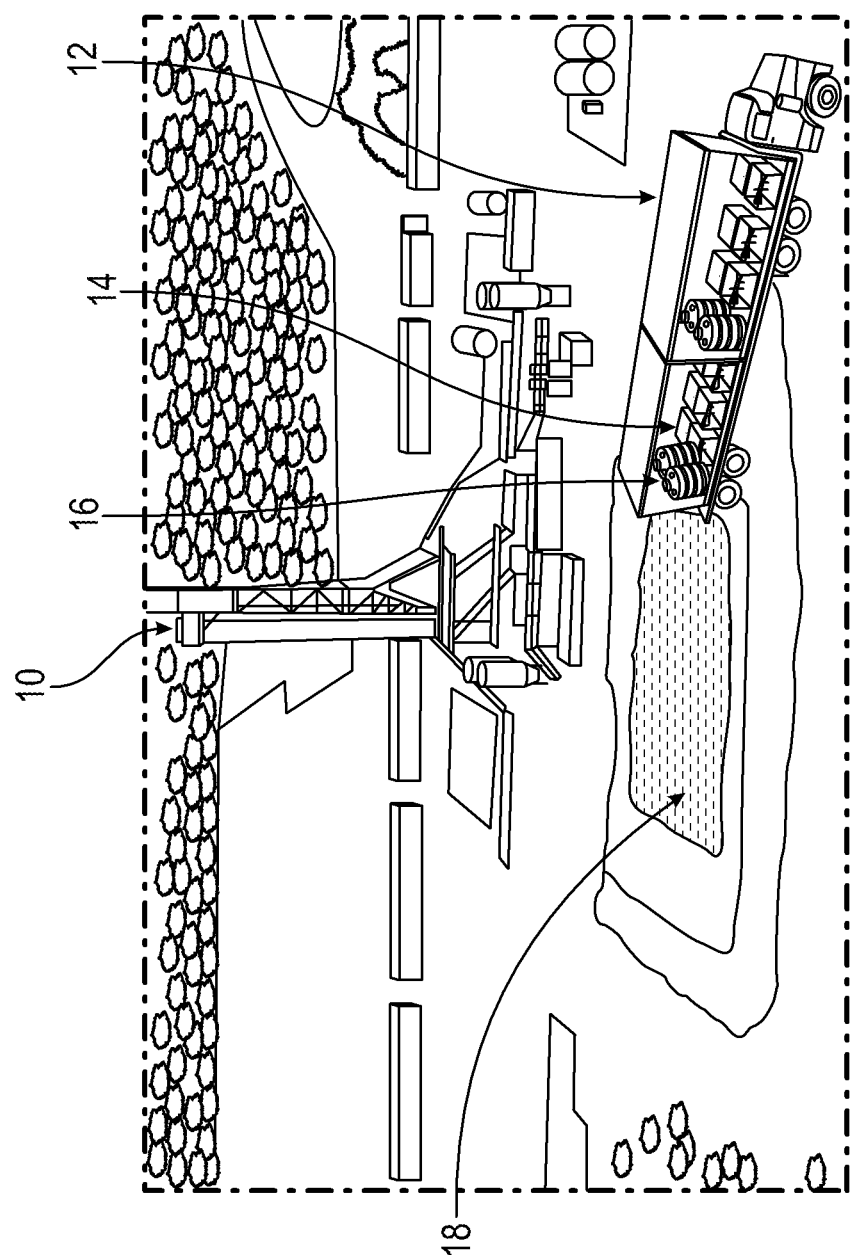
Figure 2:
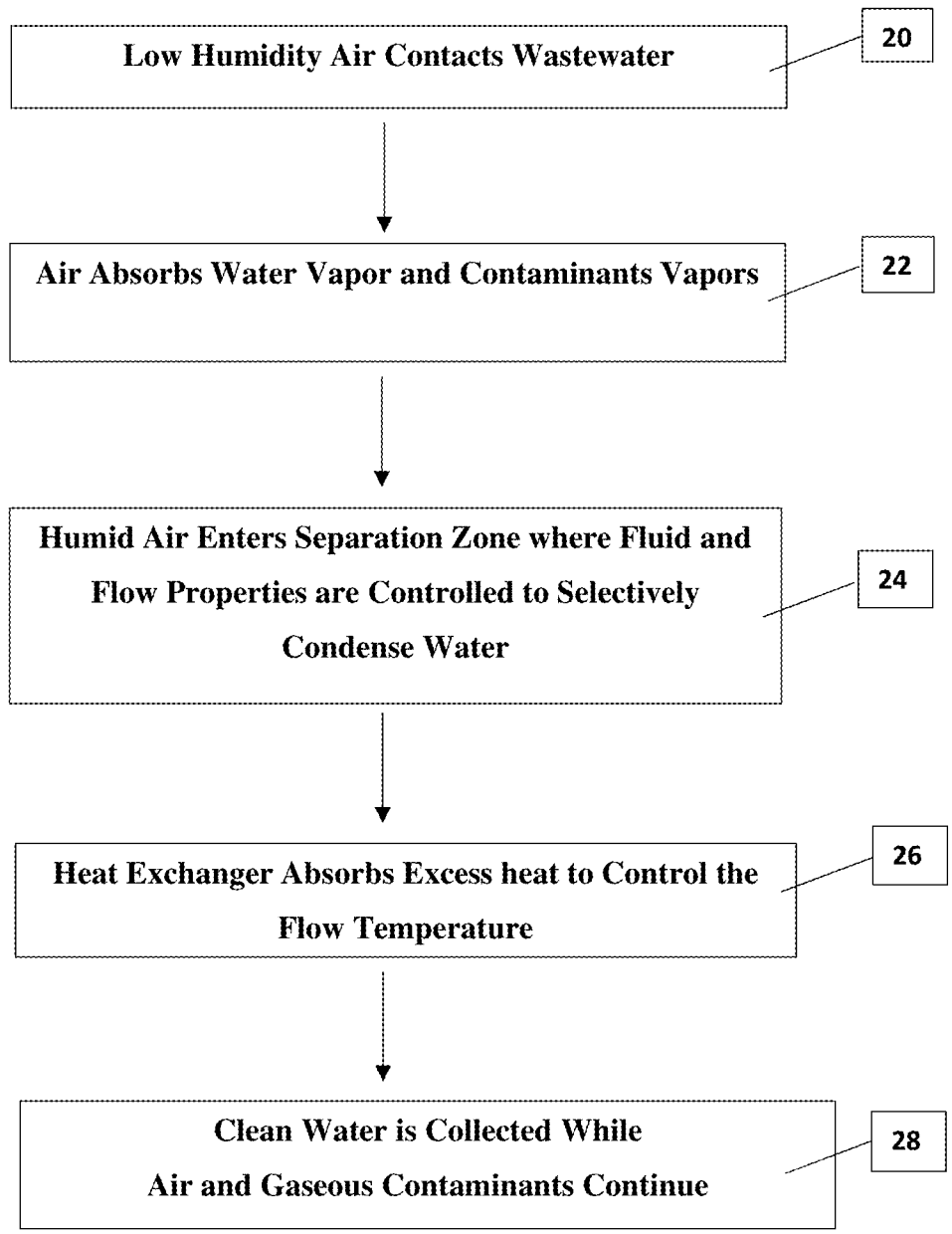

| | | | | |
|---|---|---|---|---|
| 3,648,440 A * | 3/1972 | Egan | ................... | B01D 47/06 |
| | | | | 261/36.1 |
| 3,704,570 A * | 12/1972 | Gardenier | .............. | B01D 47/10 |
| | | | | 95/227 |
| 3,782,074 A * | 1/1974 | Gardenier | ............. | B01D 47/10 |
| | | | | 95/13 |
| 4,141,701 A * | 2/1979 | Ewan | ................... | B01D 47/10 |
| | | | | 261/78.2 |
| 4,375,439 A * | 3/1983 | Hegemann | ............ | B01D 47/10 |
| | | | | 261/DIG. 54 |
| 4,478,616 A * | 10/1984 | Jarvenpaa | ............. | B01D 47/08 |
| | | | | 96/268 |
| 5,968,321 A * | 10/1999 | Sears | ................... | B01D 3/42 |
| | | | | 203/1 |
| 6,200,428 B1 * | 3/2001 | VanKouwenberg | .... | C02F 1/048 |
| | | | | 202/160 |
| 6,699,369 B1 * | 3/2004 | Hartman | ................. | B01D 1/18 |
| | | | | 159/48.1 |
| 6,962,199 B1 * | 11/2005 | Tjeenk Willink | ...... | B01D 45/16 |
| | | | | 166/177.2 |
| 8,361,281 B2 * | 1/2013 | Rock | ................... | B01D 5/006 |
| | | | | 203/1 |
| 9,546,099 B2 * | 1/2017 | Rock | ................... | B01D 5/006 |
| 2010/0038229 A1 * | 2/2010 | Nadeau, Jr. | ............. | B01D 3/10 |
| | | | | 202/176 |
| 2012/0292176 A1 * | 11/2012 | Machhammmer | ....... | B01D 1/16 |
| | | | | 202/153 |
| 2017/0233264 A1 * | 8/2017 | Boylan | ................... | C02F 1/10 |
| | | | | 203/10 |

\* cited by examiner

METHOD AND SYSTEM FOR PURIFYING CONTAMINATED WATER

CROSS REFERENCE TO RELATED APPLICATION

This application claims the benefit of the earlier filing date of U.S. provisional patent application No. 62/882,970, filed on Aug. 5, 2019, which is incorporated herein by reference in its entirety.

ACKNOWLEDGMENT OF GOVERNMENT SUPPORT

This invention was made with government support under Award No. DE-AR0001000, awarded by the United States Department of Energy. The government has certain rights in the invention.

FIELD

This disclosure concerns a system and method for purifying fluids, such as contaminated water, with certain disclosed embodiments specifically concerning purifying fracking wastewater.

BACKGROUND

The development of hydraulic fracturing technology (fracking) has aided United States' energy security. One side effect of its rapid expansion has been the production of vast quantities of highly toxic water, as much as 30,000 m$^3$ per well from 1.7 million wells, as of 2015. Reinjecting this water in the well risks eventual seepage into freshwater reservoirs and has raised major environmental and health concerns. Reliable data on the costs and energy consumption of the treatment and disposal of this contaminated water are scarce. Notwithstanding the lack of reliable data, at least four major problems have been identified for treating fracking water:

1. The variety of the chemicals: The composition of fracking wastewater is location-dependent and may contain a large and varying number and quantity of chemicals, many of which are absorbed underground. Current water treatment technologies focus on treatment of low-salinity and low-toxicity water and removal of specific chemicals. They fail to handle water with either a wide range or high concentration of contaminants.

2. Portability: About half of all fracking wastewater is produced in the first few weeks of a well's approximately 10-year life. Current contaminated water purification and desalination technologies are designed for massive stationary plants. It is cost-prohibitive to build a suitable treatment facility for only a few weeks of high throughput.

3. Energy consumption and cost: Today's most efficient purification and desalination processes use 3-5 times the minimum required energy. That is greatly amplified when the water in question is of unknown composition, is toxic, and has very high total dissolved chemicals (TDC). In a cost-sensitive industry, handling this water can differentiate an economical system and process from an uneconomical one.

4. Fouling: All membrane-based, as well as some thermal processes, involve contaminated water and/or saline water interacting with porous materials. By design, the solutes accumulate on the porous materials, be they membranes or packed beds. A solution is needed that substantially eliminates interactions between contaminated water and high-surface area porous materials to vastly decrease the rate of unwanted solute accumulation.

Tables 1 and 2 below illustrate the varied and complex composition of typical fracking wastewater.

TABLE 1

Typical Composition of Fracking Fluid (Not Wastewater)

| Compound | Amount (%) |
| --- | --- |
| Water | 90.8 |
| Sand | 8.5 |
| Acids | 0.15 |
| Clay stabilizers | 0.12 |
| Scale inhibitors | 0.09 |
| Surfactants | 0.075 |
| Friction reducer | 0.07 |
| Breakers | 0.06 |
| Biocides | 0.06 |
| Gels | 0.05 |
| pH balancing | 0.01 |
| Balance | 0.015 |

TABLE 2

Most Common Chemicals in Fracking Wastewater

| Compound | Boiling (° C.) | Density (g/ml) | Concentration 5 days (ppm) |
| --- | --- | --- | --- |
| TDS | — | — | 94,000 |
| Ammonia | −33 | 0.77 | 70 |
| Benzene | 80 | 0.89 | 625 |
| Toluene | 110 | 0.88 | 833 |
| Ethylene glycol | 197 | 1.11 | 29,700 |
| 2-Butoxy-ethanol | 171 | 0.9 | 10,000 |
| Other: Chlorides, sulfates, Na, B, Sr, Ba, trace compounds | | | Chlorides + Na: 98,000 |

A variety of water desalination systems are commercially available. However, these systems are all solely intended for processing sea and brackish water and are impractical for reclaiming fracking wastewater for the aforementioned reasons.

SUMMARY

Disclosed embodiments of the present system and process address these challenges by taking advantage of water contaminants, operating tightly around the water saturation point, and avoiding any membrane or packed bed. The disclosed invention is largely agnostic of the feed contaminated water source and composition. Accordingly, an important beneficial feature of the present invention is that it can be used to process any contaminated water composition without regard to composition. Some or all contaminants in a particular contaminated water composition may form azeotropes.

Certain disclosed embodiments concern modular, portable, and scalable technology to extract clean water from any contaminated water, with hydraulic fracturing (fracking) wastewater being one particular example. Disclosed embodiments can utilize any heat source to drive the process, although certain particular embodiments use low-grade heat to reduce or eliminate the need for electrical power consumption, providing a purification process that operates less expensively than known processes.

Certain disclosed embodiments use humidification-dehumidification in a swirling nozzle or nozzle-demister, combined with an in-line demister, to reclaim clean water or grey water from contaminated water. The swirling nozzle or nozzle-demister may be thermally actuated to reduce power consumption and enable a more energy-efficient process. Disclosed embodiments take advantage of the properties and behavior of water contaminants, as well as the thermodynamics of humid streams, to efficiently separate and condense water vapor.

One embodiment of a disclosed system comprises: an inlet to receive an aqueous composition comprising water and undesired materials, generally referred to herein as contaminated water, such as wastewater, with one example being fracking wastewater; a heat source configured to heat the contaminated water to produce contaminated water vapor; a nozzle-demister having a gas inlet configured to admit dry gas to the nozzle-demister; a contaminated water vapor inlet; and a condenser/separator, such as a heat exchanger or a demister. The nozzle-demister typically also includes a clean water conduit for receiving clean water from the clean water outlet, and a fluid waste conduit for receiving fluid waste from a fluid waste outlet. The system can be configured, such that the gas inlet, the contaminated water vapor inlet, or both, are injected tangentially into the system to create a swirling fluid flow. Alternatively, or additionally, the nozzle demister may further comprise a vortex generator to produce a rotating or swirling heated gas. The vortex generator may include one or more stationary or annular fins to induce swirl. A swirling motion also may be induced before the flow enters the nozzle. Gas enters the nozzle-demister through a gas inlet port and flows past the vortex generator, which directs the gas into a fast-moving gas jet. Contaminated water can be supplied to the contaminated water tank through the contaminated water inlet or inlets. In certain embodiments, additional heat is added to the contaminated water to produce contaminated water vapor. The contaminated water vapor can be introduced to the nozzle demister through a contaminated water vapor inlet where it mixes with the fast-moving gas jet, yielding a humid stream of gas, water vapor, and waste vapor. In certain embodiments, the humid stream of gas, water vapor, and waste vapor can then be separated by a condenser/separator, such as a heat exchanger or demister, which causes the water to condense out of the humid stream. Condensed water can then be collected at a clean water outlet and directed into the clean water conduit. In certain embodiments, the remaining gas and waste vapor passes through the system and is collected at a fluid waste outlet, from which it flows into a fluid waste conduit.

Yet another disclosed aspect of the invention concerns a system for purifying contaminated water, particularly fracking wastewater, comprising a thermally-actuated swirling nozzle or nozzle-demister. Generally, the system can include a contaminated water tank, at least one contaminated water inlet, a thermally-actuated nozzle-demister, a clean water conduit, and a fluid waste conduit. In certain embodiments, gas enters the thermally-actuated nozzle-demister through a gas inlet port. The gas can be heated, causing it to accelerate within the nozzle-demister. The gas flows past a vortex generator having one or more stationary vanes, which direct the gas into a fast-moving gas jet. In some embodiments, contaminated water can be supplied to the contaminated water tank through the contaminated water inlet or inlets. The contaminated water tank may have a sludge drain to facilitate the removal of dense, solid wastes. Additional heat can be added to the contaminated water to produce contaminated water vapor. The contaminated water vapor can be introduced to the thermally-actuated nozzle-demister through a contaminated water vapor inlet and mixed with the fast-moving gas jet. In certain embodiments, the fast-moving gas jet with entrained contaminated water vapor flows into a converging nozzle that concentrates the flow of the fast-moving jet, increases the jet's speed and reduces its temperature. The temperature of the fast-moving gas jet with entrained contaminated water vapor can be reduced to a temperature below the saturation temperature of the gas to condense water vapor entrained in the gas, yielding a misty mixture of gas, waste vapor, and fine, condensed droplets of clean water. In certain embodiments, an in-line demister separates the fine, condensed droplets of clean water from the mixture of gas and waste vapor. The condensed droplets are collected at a clean water outlet and flow into a clean water conduit. In certain embodiments, the remaining mixture of gas and waste vapor flows through the in-line demister and into a diverging nozzle. In the diverging nozzle, the waste vapor may condense or partially condense, yielding a mixture of gas, gaseous waste, and liquid waste, which can be collected at a fluid waste outlet. The mixture of gas, gaseous waste, and liquid waste flow into a fluid waste conduit.

In certain embodiments, condensation heat from the condensation of water droplets in the converging nozzle can be recovered and transferred to the contaminated water. This may be accomplished, for example, by positioning a heat exchanger between one or more of the contaminated water inlets and the converging nozzle.

In certain embodiments, excess heat from the clean water and the fluid waste can be recovered and transferred to the contaminated water in the contaminated water tank. This may be accomplished, for example, by positioning a heat exchanger between the clean water conduit and the contaminated water tank and/or between the fluid waste conduit and the contaminated water tank.

In certain embodiments, gas supplied to the nozzle-demister may be air, which may, at various sections of the system, also be dry. At various sections of the system, the air may have a first velocity, $V_1$, approaching but greater than 0 m/s. At other sections of the system, the air may have a second velocity, $V_2$, greater than the $V_1$.

Contaminated water that may be processed using various disclosed system embodiments and method for their use may have any of a variety of contaminants, in any and all combinations. Examples of typical contaminants include, without limitation, sand, acids, clay stabilizers, surfactants, ammonia, benzene, toluene, ethylene glycol, 2-butoxy-ethanol, chlorides, sulfates, sodium, boron, strontium, barium, and any and all combinations thereof.

Other disclosed aspects of the invention concern a method for using disclosed embodiments of a contaminated water purification device. One generalized embodiment of the method involves bringing hot, low-humidity gas into contact with contaminated water to form humid gas with entrained water vapor, waste vapor, and vaporized contaminants. The method can further involve accelerating the humid gas with entrained vapors and imparting an angular velocity to enhance the mixing of the gas and vapors. In certain embodiments, the method can further involve reducing the temperature of the humid gas with entrained water vapor, waste vapor, and vaporized contaminants below the saturation temperature of water to condense water from the humid gas, which can be collected while leaving the gas and waste vapor behind.

Yet another disclosed aspect of the invention concerns a method for using a disclosed water purification system comprising a thermally-actuated swirling nozzle or nozzle-demister. The method generally involves supplying contaminated water to a contaminated water tank through one or more contaminated water inlets. Gas having a first velocity is supplied to a nozzle-demister through a gas inlet and accelerated to a second velocity greater than the first velocity. In certain embodiments, the acceleration can be caused by heating the gas within the nozzle-demister. The accelerated gas is directed past a vortex generator to produce a high-speed gas jet. In certain embodiments, the method may further involve supplying contaminated water vapor from the contaminated water tank to the nozzle-demister through a contaminated water vapor inlet. Contaminated water vapor can be entrained in the high-speed gas jet to yield a humid gas-contaminated water stream having entrained water and waste vapors. In certain embodiments, the method can further involve supplying the humid gas-contaminated water stream to a converging nozzle, which increases the velocity and decreases the temperature of the humid gas-contaminated water stream. Reducing the temperature of the gas-contaminated water stream condenses clean water droplets, which may be separated from the gas and waste vapor in the humid stream with an inline-demister. The separated water droplets can then be collected at a clean water outlet in the nozzle-demister and supplied to a clean water conduit. In certain embodiments, the method further involves supplying the remaining gas and waste vapor stream to a diverging nozzle, which decreases the velocity of the gas and waste vapor stream and allows the waste vapor to condense or partially condense. The mixture of gas, gaseous waste, and/or liquid waste exits the nozzle-demister through a fluid waste outlet and passes to a fluid waste conduit.

In certain disclosed embodiments, the method further involves recapturing the heat from the condensation of the clean water droplets within the converging nozzle. This recaptured heat can be supplied to the contaminated water in the contaminated water inlets. The method can also further involve recapturing excess heat from the clean water conduit and the fluid waste conduit. This heat can be supplied to the contaminated water in the contaminated water tank.

In certain embodiments, the gas supplied to the nozzle-demister may be air, which may at various sections of the system also be dry. At various sections of the system, the air may have a first velocity approaching 0 m/s. At other sections of the apparatus, the air may have a second velocity greater than the first.

The foregoing and other objects, features, and advantages of the invention will become more apparent from the following detailed description, which proceeds with reference to the accompanying figures.

BRIEF DESCRIPTION OF THE DRAWINGS

FIG. 1 is a schematic of a portable and modular contaminated water treatment unit in accordance with the present disclosure at a fracking site.

FIG. 2 is a flowchart illustrating a general contaminated water treatment process in accordance with this disclosure.

FIG. 3 is a schematic illustrating one exemplary embodiment of a contaminated water treatment system in accordance with the present disclosure.

FIG. 4 is a perspective schematic showing a cross section of one embodiment of a swirling nozzle demister in accordance with an embodiment of this disclosure.

FIG. 5 is a schematic showing various exemplary heat exchangers in accordance with the present disclosure.

DETAILED DESCRIPTION

The following detailed description is provided with reference to the drawings and embodiments described herein. The drawings are illustrative and are not intended to limit the scope of the disclosure.

I. Definitions

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges refers to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Azeotrope refers to a mixture of two liquids having a substantially constant boiling point and composition during an evaporation process, such as distillation.

II. Introduction

Described herein are embodiments of a system for purifying contaminated water, particularly wastewater from a fracking process. Also disclosed herein are embodiments of a method for using the disclosed system.

FIG. 1 illustrates a portable and modular contaminated water treatment unit in accordance with the present disclosure at a fracking site. The fracking site includes fracking equipment 10 for performing a fracking process. A portable, modular contaminated water processing system 12 according to the present disclosure can be positioned adjacent fracking equipment 10. Modular contaminated water processing system 12 includes plural water treatment modules 14, comprising plural processed water storage tanks 16. The fracking site also includes a wastewater pool 18.

FIG. 2 illustrates a generalized sequence for one disclosed embodiment of a method for purifying contaminated water, such as fracking wastewater. In a first process step 20, hot, low-humidity gas is brought into contact with contaminated water containing contaminants. The low-humidity gas absorbs contaminated water and contaminants in vapor form, yielding humid gas with water and waste vapor in process step 22. The humid gas enters a nozzle-demister in process step 24, which further mixes the gas, water vapor, and waste vapor, and imparts angular velocity. The temperature of the humid gas is reduced to condense water vapor into water droplets in step 26, which are rejected from the humid gas flow. Condensed clean water droplets are then collected in process step 28, leaving the gas and contaminants within the nozzle-demister.

Figure 3:
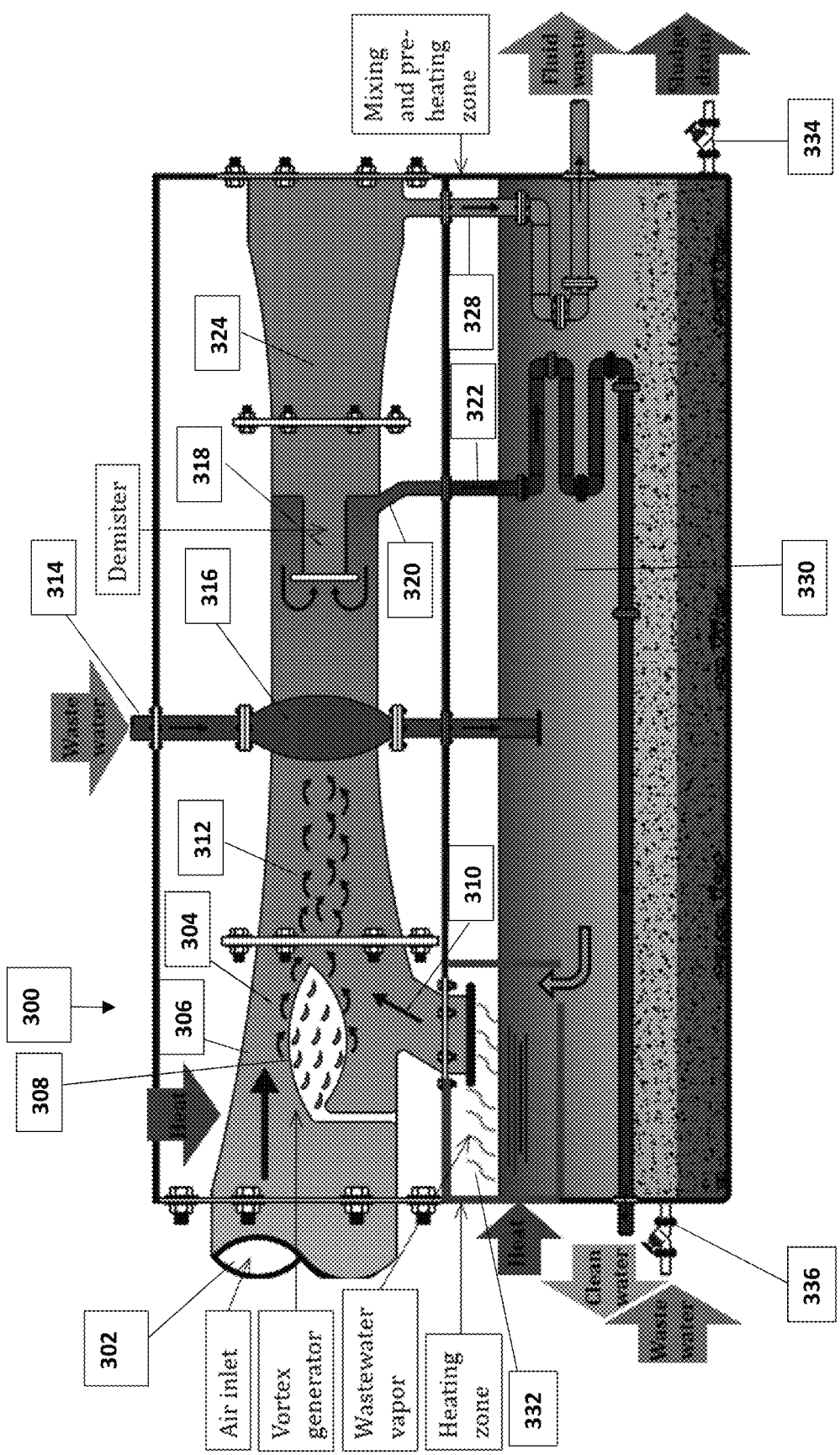

FIG. 3 illustrates one exemplary embodiment of a water purification system 300 in accordance with the present disclosure. Dry, stagnant gas, typically air, having a first velocity $V_1$ near 0 m/s and a first temperature $T_0$, enters the water purification system 300 at gas inlet 302 of nozzle-demister 304. The gas is then heated to a temperature $T_1$ greater than $T_0$ by heat communicated through wall 306 of nozzle-demister 304 and the heated gas reaches a second velocity $V_2$ greater than $V_1$. System 300 includes a vortex generator 308 to produce a rotating high-speed gas jet from heated gas at temperature $T_1$ and velocity $V_2$. A person of ordinary skill in the art will appreciate that any structure capable of producing a rotating gas can be useful as a vortex generator 308, including a device having one or more stationary vanes or annular fins. Slow-moving contaminated water vapor from contaminated water reservoir 330 enters the nozzle-demister 304 through contaminated water vapor inlet 310 and becomes entrained in the high-speed gas jet produced by vortex generator 308 to form a humid gas-contaminated water vapor stream having a third temperature $T_3$, a third velocity $V_3$, and a saturation temperature $T_3$-sat. System 300 includes one or more devices to alter the properties, such as velocity and pressure, in the flow stream. For certain disclosed embodiments, the humid gas-contaminated water vapor stream accelerates through a device that adjusts pressure and velocity in the flow stream. Embodiments can include, for example, a converging nozzle 312 to accelerate the flow to a fourth velocity $V_4$ greater than $V_3$, during which enthalpy of the flow stream converts to kinetic energy. This reduces the temperature of the stream to a fourth temperature $T_4$ less than $T_3$, where $T_3$ is below the saturation temperature of the stream in that thermodynamic state. Disclosed systems need not have a converging nozzle 312 if flow stream velocity and/or pressure are adjusted upstream. In these embodiments nozzle 312 can be replaced with a straight pipe. For the exemplary embodiment illustrated by FIG. 3, water condenses out of the humid gas-contaminated water vapor stream and creates a misty flow within converging nozzle 312. Condensation heat transfers from the misty flow within converging nozzle 312 to contaminated water inlet 314 by contacting heat exchanger 316. Centrifugal forces push the condensed water droplets to a device suitable to dehumidify the flow stream and separate water. This process can be achieved using a number of devices configured to condense and separate water, such as conventional heat exchangers. One aspect of certain disclosed embodiments of the present invention is to control thermodynamic properties of fluids, particularly temperature and pressure, in the system. For example, to obtain clean water using the system, the thermodynamic properties of contaminated water fluids comprising water are adjusted to approach the dew point of water in the composition, which dew point depends on the actual composition of the fluid flow. And the composition of the contaminated water processed by the system can vary over time. Accordingly, the composition of the contaminated water can be monitored over time to adjust the physical parameters of temperature and pressure to approach the dew point of water to condense substantially pure water from the contaminated water stream. In the exemplary embodiment illustrated by FIG. 3, centrifugal forces push the condensed water droplets to the periphery of the nozzle-demister 304, where demister 318 extracts the water droplets from the misty flow. Condensed water droplets are collected at clean water outlet 320 and flow into clean water conduit 322 while the remaining gas and waste vapor stream passes through demister 318 and into diverging nozzle 324. System 300 also can include a second device to control flow properties, such as velocity and pressure. Certain disclosed embodiments include a diverging nozzle 324, where waste vapor is condensed to liquid waste and is collected at waste outlet 326, where it flows into waste conduit 328 for safe disposal. Alternatively, waste vapor can be routed to appropriate system locations and ignited to provide additional heat to the system. Contaminated water is supplied to the system through contaminated water inlet 314. Contaminated water in contaminated water inlet 314 is heated at heat exchanger 316 by condensation heat from converging nozzle 312 before collecting in contaminated water reservoir 330. Additional contaminated water may be supplied from contaminated water inlet 336. Contaminated water in reservoir 330 is heated to produce contaminated water vapor. Heat energy needed to vaporize the contaminated water can be supplied by heat rejected from clean water conduit 322 and/or waste conduit 328, as well as by external heat source 332. The vaporization of contaminated water within contaminated water reservoir 330 may leave heavier waste products behind. The accumulation of such heavier waste products may be removed via sludge drain 334.

Figure 4:
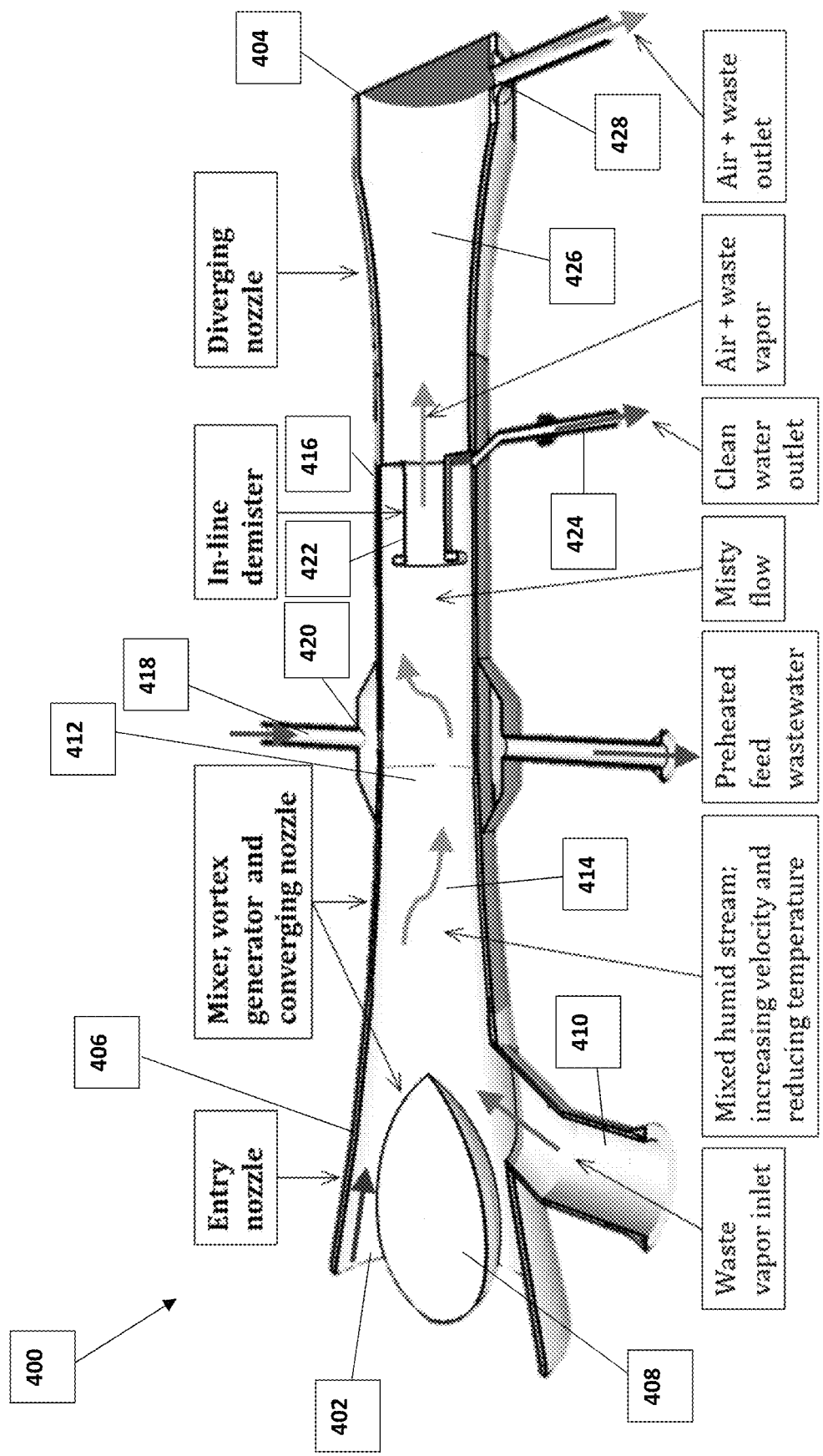

FIG. 4 illustrates an exemplary embodiment of a thermally-actuated nozzle-demister 400 having a gas intake end 402 and a gas outlet end 404. Gas enters nozzle-demister 400 through gas intake end 402 and is warmed by heat conducted through nozzle-demister wall 406. Vortex generator 408 is positioned near gas intake end 402 and directs gas entering the nozzle-demister 400 into a gas jet. Contaminated water vapor enters nozzle-demister 400 through waste vapor inlet 410, and mixes with the gas jet from vortex generator 408 to form a humid, gas-contaminated water vapor stream. Converging nozzle 412 is located downstream from waste vapor inlet 410 and has proximal end 414 and distal end 416. The humid gas-contaminated water vapor stream enters converging nozzle 412 at proximal end 414 increases in velocity and decreases in temperature, thereby causing water droplets to condense as the humid gas-contaminated water vapor stream approaches distal end 416. Heat from the condensation of the water droplets is transferred to contaminated water inlet feed 418 at heat exchanger 420. In-line demister 422 is located at distal end 416 of converging nozzle 412. As water condenses from the humid gas-contaminated water vapor stream, inline demister 422 causes water droplets to form and collect at clean water outlet 424, while gas and waste vapor pass through inline demister 422 and into diverging nozzle 426. Diverging nozzle 426 is located downstream of in-line demister 422 and causes waste vapor entrained in gas flowing through demister 422 to condense into liquid waste, which is collected at gas and waste outlet 428, located at gas outlet end 404 of nozzle-demister 400.

Figure 5:
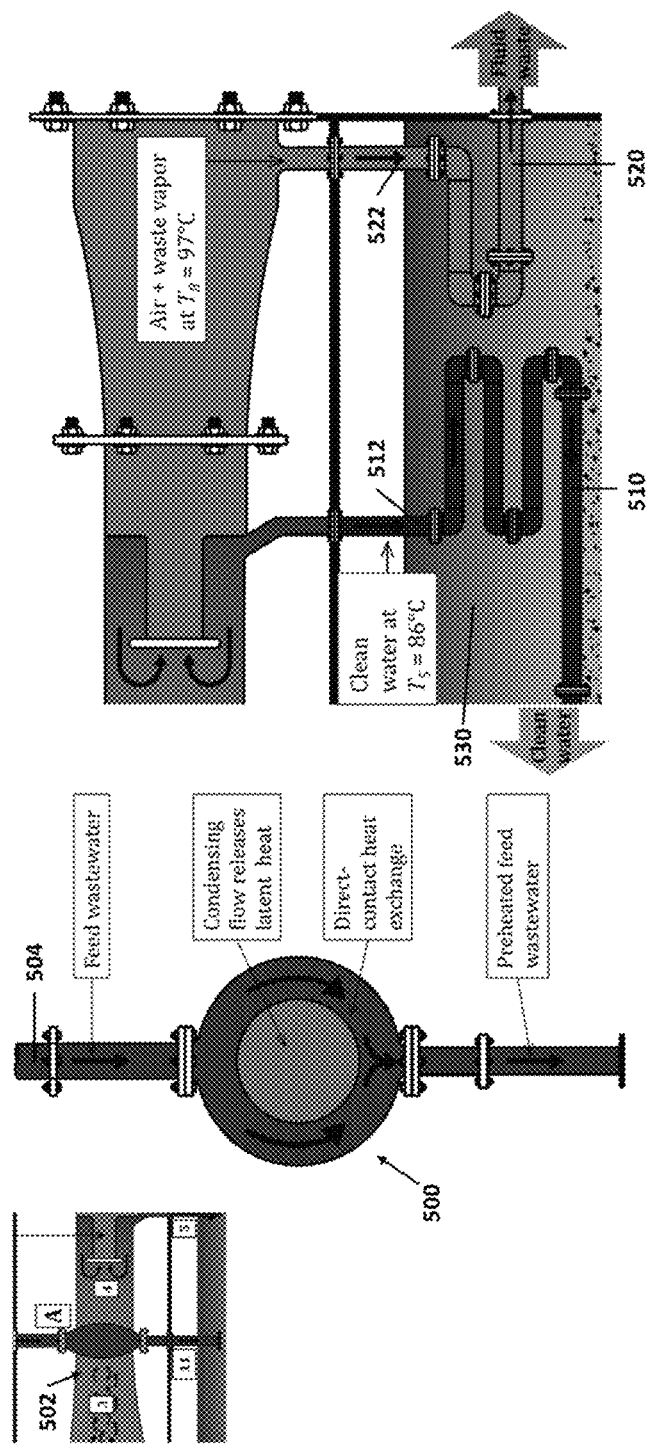

FIG. 5 illustrates exemplary embodiments of heat exchangers in accordance with the present disclosure and suitable for use in embodiments previously discussed. Heat exchanger 500 transfers heat from the humid gas-contaminated water vapor stream within the nozzle-demister 502 to feed contaminated water supplied from contaminated water intake 504 and may allow condensation heat from the condensation of water droplets to be recaptured. Heat exchanger 510 transfers heat from condensed, clean water in clean water conduit 512 to contaminated water in contaminated water reservoir 530 and may reduce the additional heat that must be supplied to vaporize the contaminated water. Heat exchanger 520 transfers heat from condensed, fluid waste in waste conduit 522 to contaminated water in contaminated water reservoir 530 and may reduce the additional heat that must be supplied to vaporize the contaminated water.

The following example is provided to illustrate certain aspects of disclosed embodiments for producing clean water. A person of ordinary skill in the art will appreciate that the scope of the present invention is not limited to the particular features of this example.

Example 1

In one example of a method for producing 1 kg of clean water by the purification of contaminated water, 3 kg of dry air having a first velocity near 0 m/s and a first temperature of 25° C. enters the nozzle demister. Heat is supplied to the dry air, heating it to 85° C. and accelerating it to 25 m/s as it passes a vortex generator that directs the air into a high-speed air jet. 1.1 kg of contaminated water vapor at or near a saturation temperature of 109° C. and having a velocity near 0 m/s is added to the high-speed air jet, yielding 4.1 kg of humid air-contaminated water vapor with a temperature of 95° C., a saturation temperature of 90° C., and a velocity of 18 m/s. The humid air-contaminated water vapor passes into the convergence nozzle and the temperature drops to 86° C. as the vapor accelerates, which is below the saturation temperature of the humid air-contaminated water vapor. 1 kg of water condenses into droplets having a temperature of 86° C., the water is removed from the humid air-contaminated water vapor by an in-line demister, and is collected at the clean water outlet. Clean water collected at the clean water outlet passes into the clean water conduit at 86° C., and excess heat is rejected to the contaminated water reservoir. Condensation heat is transferred from the convergence nozzle to feed contaminated water at 25° C., raising the feed contaminated water temperature before it is added to the contaminated water reservoir. Remaining 3.1 kg of air-contaminated water vapor, having a temperature of 86° C. and a velocity of 148 m/s, passes through the in-line demister and into the divergence nozzle, where it heats to 97° C. and slows to a velocity of 10 m/s. Waste vapor begins to condense into liquid waste, and the mixture of air, gaseous waste, and liquid waste is collected at the air and waste outlet. Excess heat from the mixture of air, gaseous waste, and liquid waste is rejected to the contaminated water reservoir.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A system for purifying contaminated water, comprising:
   a contaminated water reservoir to receive contaminated water through a contaminated water inlet;
   a heat source configured to heat the contaminated water to produce a hot contaminated water vapor stream; and
   a nozzle-demister having a gas inlet configured to admit dry gas to the nozzle-demister, a contaminated water vapor inlet that receives the contaminated water vapor stream from the contaminated water reservoir, a condenser/separator, a clean water outlet, and a fluid waste outlet.

2. The system according to claim 1 configured to process fracking wastewater.

3. The system according to claim 1 where the condenser/separator is a demister.

4. The system of claim 1, wherein the nozzle-demister is a thermally actuated nozzle demister.

5. The system according to claim 1 wherein the dry gas, the contaminated water vapor, or both, are injected tangentially into the system to introduce fluid swirl.

6. The system according to claim 1 wherein the nozzle demister further comprises a vortex generator to produce a rotating heated gas.

7. The system according to claim 1 wherein the nozzle-demister comprises:
   the gas inlet configured to admit the dry gas to the nozzle demister;
   a heat exchange wall configured to transmit heat to gas admitted through the gas inlet and to confine gas flow;
   a vortex generator configured to produce a high-speed gas jet from the gas admitted to the nozzle demister;
   the contaminated water vapor inlet configured to admit the hot contaminated water vapor stream to the nozzle-demister;
   a first device for adjusting pressure and/or velocity in the hot contaminated water vapor stream, the first device configured to concentrate flow of the humid gas-contaminated water vapor stream and to cause water condensation;
   the demister and condenser configured to collect water condensed from the humid gas-contaminated water stream, while permitting the remaining gas and waste vapor mixture to pass through;
   the clean water outlet configured to permit clean, condensed water from the nozzle-demister to flow to the clean water conduit;
   the fluid waste outlet configured to remove the gas, gaseous waste, and liquid waste from the nozzle demister.

8. The system according to claim 7, wherein:
   the first device for adjusting pressure and/or velocity in fluid flow is a converging nozzle configured to concentrate flow of the hot contaminated water vapor stream and to condense water;
   the second device for adjusting pressure and/or velocity in fluid flow is a diverging nozzle; or
   both.

9. The system according to claim 1 wherein the nozzle demister is configured to provide a gaseous exhaust fluidly routed to a heating zone, wherein the gaseous exhaust is ignited to provide heat for the system and to scrub unburned volatile compounds from the exhaust.

10. The system according to claim 1, wherein gas admitted through the gas inlet is substantially dry air and the dry air is heated by the system.

11. The system according to claim 1, further comprising a first heat exchanger, comprising:

a feed contaminated water inlet configured to receive low-temperature contaminated water; and a heat exchange region in contact with the converging nozzle of the nozzle-demister and configured to transfer heat from the hot contaminated water vapor stream to the incoming contaminated water.

12. The system according to claim 11, further comprising:

a second heat exchanger configured to transfer heat from a clean water conduit to the contaminated water;

a third heat exchanger configured to transfer heat from a fluid waste conduit to the contaminated water; or both.

13. The system according to claim 1, further comprising a sludge drain configured for removal of dense, solid waste from the contaminated water housed in the contaminated water reservoir.

14. A method, comprising:

providing a system according to claim 1; and operating the system to purify contaminated water.

15. The method according to claim 14, comprising:

supplying gas to the nozzle-demister through the gas inlet;

accelerating the gas supplied to the nozzle demister and producing a high-speed gas jet;

supplying the contaminated water vapor to the nozzle-demister;

entraining the contaminated water vapor in a high-speed gas jet to create a humid gas-contaminated water stream;

supplying the humid gas-contaminated water stream to a converging nozzle to increase the velocity and decrease a gas contaminated water stream temperature;

condensing water out of the gas-contaminated water stream as the gas-contaminated water stream cools;

supplying condensed water to a clean water conduit through a clean water outlet in the nozzle-demister;

supplying a gas and waste vapor stream to a diverging nozzle to decrease velocity of the gas and waste vapor stream to condense liquid waste;

supplying the gas, gaseous waste, and/or liquid waste to a fluid waste conduit; and collecting clean water and fluid waste from the process.

16. The method according to claim 15 wherein the contaminated water is fracking wastewater.

17. The method according to claim 16, wherein the wastewater contains, sand, acids, clay stabilizers, surfactants, ammonia, benzene, toluene, ethylene glycol, 2-butoxy-ethanol, chlorides, sulfates, sodium, boron, strontium, barium, or any combination thereof.

18. The method according to claim 15 comprising using a vortex generator to generate the high speed gas jet.

19. The method according to claim 15, wherein the gas admitted through the gas inlet is substantially dry air.

20. The method according to claim 15, wherein the dry gas supplied to the nozzle demister is accelerated by supplying heat energy.

21. The method according to claim 15 wherein condensation heat from condensing water out of the gas-contaminated water stream is transferred to contaminated water in one or more contaminated water inlets.

22. The method according to claim 15 wherein:

heat from the clean water conduit is transferred to the contaminated water;

heat from the fluid waste conduit is transferred to the contaminated water; or both.

23. A thermally-actuated nozzle-demister, comprising;

a gas inlet configured to admit a dry gas to the nozzle demister;

a heat exchange wall configured to transmit heat to the gas admitted through the gas inlet;

a vortex generator configured to produce a high-speed gas jet from the gas admitted to the nozzle demister;

a contaminated water vapor inlet configured to admit hot contaminated water vapor obtained from a contaminated water reservoir to the nozzle-demister;

a converging nozzle configured to concentrate flow of a humid gas-contaminated water vapor stream and induce water condensation;

an in-line demister and condenser configured to collect water condensed from the humid gas-contaminated water stream, and to permit the remaining gas and waste vapor mixture to pass through;

a clean water outlet configured to remove clean, condensed water from the nozzle-demister;

a diverging nozzle configured to slow gas and waste vapor flow and condense liquid waste from the waste vapor; and a gas and waste outlet configured to remove gas, gaseous waste, and liquid waste from the nozzle demister.

24. A method, comprising:

providing a thermally-actuated nozzle-demister according to claim 23; and operating the thermally-actuated nozzle-demister in a process for purifying contaminated water.

25. A system, comprising:

contaminated water reservoir means;

heat source means configured to heat contaminated water in the contaminated water reservoir means to produce contaminated water vapor; and nozzle-demister means for receiving contaminated water vapor from the contaminated water reservoir and for mixing the contaminated water vapor with a carrier fluid.

26. A system for purifying contaminated water, comprising:

a contaminated water inlet to receive contaminated water;

a heat source configured to heat the contaminated water to produce a hot contaminated water vapor stream; and a nozzle-demister having (a) a gas inlet configured to admit dry gas to the nozzle demister, (b) a heat exchange wall configured to transmit heat to gas admitted through the gas inlet and to confine gas flow, (c) a vortex generator configured to produce a high-speed gas jet from the gas admitted to the nozzle demister, (d) a contaminated water vapor inlet configured to admit the hot contaminated water vapor stream to the nozzle-demister, (e) a pressure and/or velocity adjustor to adjust pressure and/or velocity in the hot contaminated water vapor stream, the pressure and/or velocity adjustor configured to concentrate flow of the humid gas-contaminated water vapor stream and to cause water condensation, (0 the demister and condenser configured to collect water condensed from the humid gas-contaminated water stream, while permitting the remaining gas and waste vapor mixture to pass through, and (g) a clean water outlet configured to permit clean, condensed water from the nozzle-demister to flow to the clean water conduit, and (h) a fluid waste outlet configured to remove the gas, gaseous waste, and liquid waste from the nozzle demister.

* * * * *